US007772805B2

(12) United States Patent
Yamamoto et al.

(10) Patent No.: US 7,772,805 B2
(45) Date of Patent: Aug. 10, 2010

(54) CHARGE/DISCHARGE PROTECTION CIRCUIT UTILIZING A CHARGER CONNECTION RECOVERY CIRCUIT THAT CYCLES A DISCHARGE CONTROL TRANSISTOR ON AND OFF WHILE A BATTERY IS OVER-DISCHARGED DURING CHARGING

(75) Inventors: Norifumi Yamamoto, Kanagawa (JP); Akihiko Fujiwara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 204 days.

(21) Appl. No.: 11/996,937

(22) PCT Filed: May 15, 2007

(86) PCT No.: PCT/JP2007/060319

§ 371 (c)(1),
(2), (4) Date: Jan. 25, 2008

(87) PCT Pub. No.: WO2007/138901

PCT Pub. Date: Dec. 6, 2007

(65) Prior Publication Data

US 2009/0251104 A1    Oct. 8, 2009

(30) Foreign Application Priority Data

Jun. 1, 2006    (JP) .............................. 2006-153848

(51) Int. Cl.
*H02J 7/10* (2006.01)
(52) U.S. Cl. ........................ 320/134; 320/132; 320/162; 320/163
(58) Field of Classification Search ................. 320/132, 320/134
See application file for complete search history.

(56) References Cited

U.S. PATENT DOCUMENTS

| 5,530,336 | A | * | 6/1996 | Eguchi et al. ................ 320/118 |
| 5,617,010 | A | * | 4/1997 | Higashijima et al. ........ 320/134 |
| 5,789,900 | A | * | 8/1998 | Hasegawa et al. ........... 320/132 |
| 5,890,780 | A | * | 4/1999 | Tomiyori ...................... 307/86 |
| 5,896,025 | A | * | 4/1999 | Yamaguchi et al. ......... 320/134 |
| 5,959,437 | A | * | 9/1999 | Hamaguchi ................. 320/134 |
| 5,990,663 | A | * | 11/1999 | Mukainakano .............. 320/134 |

(Continued)

FOREIGN PATENT DOCUMENTS

JP    10-285810    10/1998

(Continued)

*Primary Examiner*—Edward Tso
*Assistant Examiner*—Manuel Hernandez
(74) *Attorney, Agent, or Firm*—Dickstein Shapiro LLP

(57) ABSTRACT

A charge/discharge protection circuit that protects a secondary battery from overcharge, over-discharge, charge over-current, and discharge over-current is disclosed. The charge/discharge protection circuit includes an overcharge detection circuit, an over-discharge detection circuit, a charge over-current detection circuit, a discharge over-current detection circuit, a charge control FET that is turned off when overcharge is detected and when charge over-current is detected, a discharge control FET that is turned off when over-discharge is detected and when discharge over-current is detected, and a charger connection recovery circuit that controls on/off operations of the discharge control FET. When connection with a charger is established at a time over-discharge is detected and the discharge control FET is turned off, the discharge control FET is forcefully turned on after a first predetermined time elapses.

6 Claims, 9 Drawing Sheets

U.S. PATENT DOCUMENTS

| | | | |
|---|---|---|---|
| 6,313,610 B1 * | 11/2001 | Korsunsky | 320/134 |
| 6,437,541 B1 * | 8/2002 | Sakurai | 320/134 |
| 2002/0050806 A1 | 5/2002 | Fujiwara | |
| 2002/0089308 A1 * | 7/2002 | Sakurai | 320/134 |
| 2003/0141847 A1 | 7/2003 | Fujiwara | |
| 2003/0141848 A1 | 7/2003 | Fujiwara | |

FOREIGN PATENT DOCUMENTS

| | | |
|---|---|---|
| JP | 11-215716 | 8/1999 |
| JP | 2002-176730 | 6/2002 |
| JP | 2003-235172 | 8/2003 |
| JP | 2004-64915 | 2/2004 |

* cited by examiner

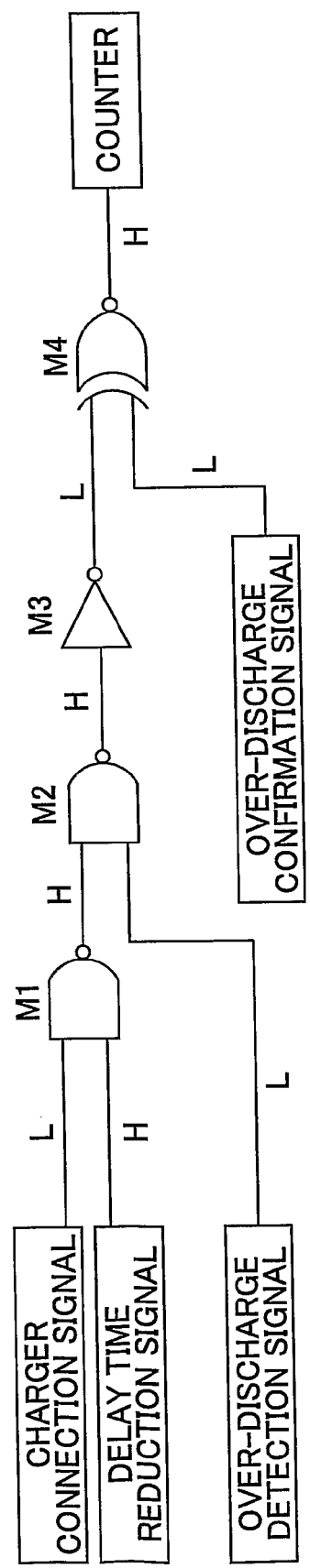

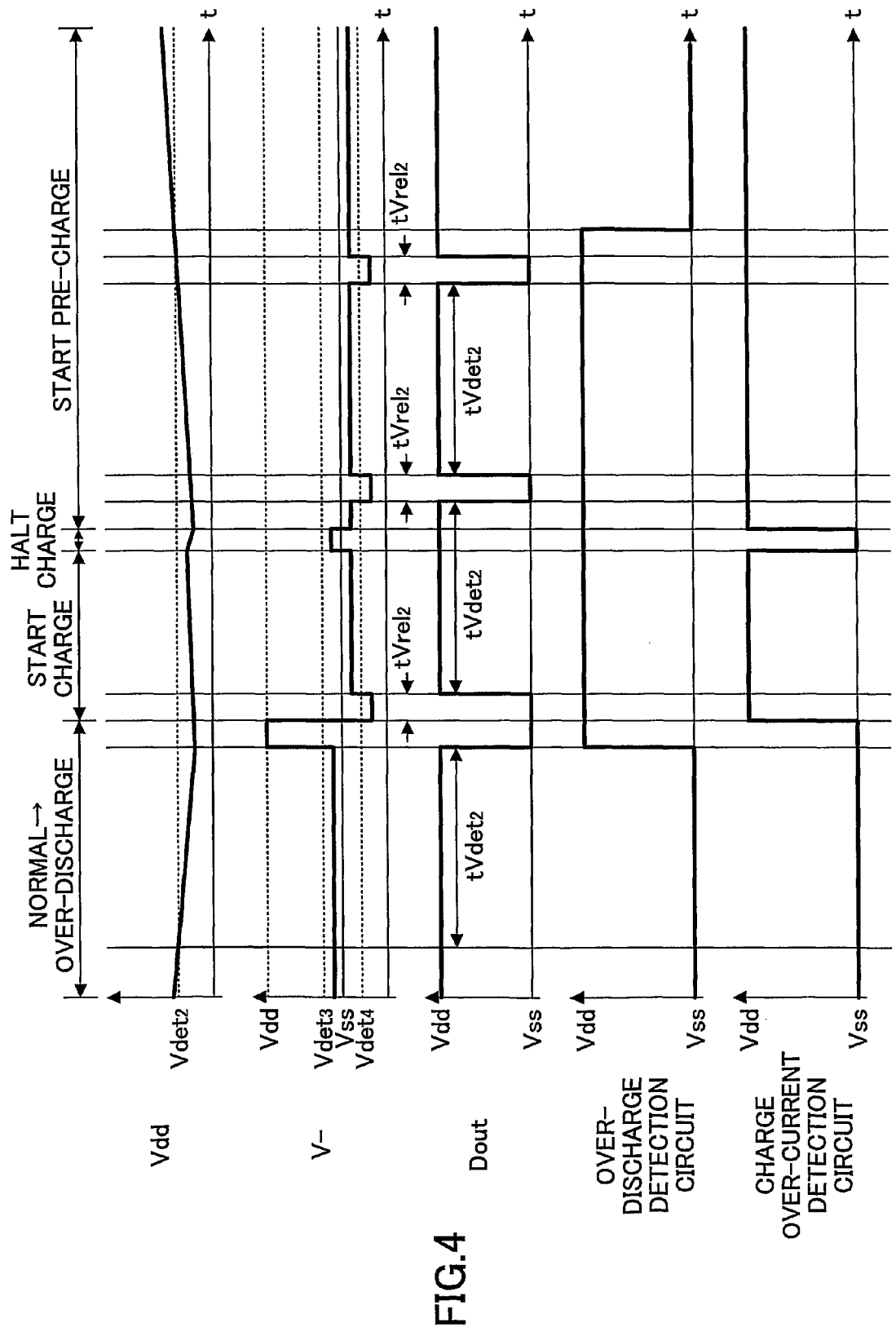

CHARGE/DISCHARGE PROTECTION CIRCUIT UTILIZING A CHARGER CONNECTION RECOVERY CIRCUIT THAT CYCLES A DISCHARGE CONTROL TRANSISTOR ON AND OFF WHILE A BATTERY IS OVER-DISCHARGED DURING CHARGING

TECHNICAL FIELD

The present invention relates to a charge/discharge protection circuit of a lithium-ion secondary battery, for example, that is capable of reducing electric current consumption without increasing the chip size, preventing degradation of a discharge control FET, and reducing the battery charge time. The present invention also relates to a battery pack embedding such a charge/discharge protection circuit and various types of electronic apparatuses that use such a battery pack.

BACKGROUND ART

Various techniques related to a charge/discharge protection circuit of a lithium-ion secondary battery have been proposed. For example, Japanese Laid-Open Patent Publication No. 2002-176730 discloses a semiconductor device employed as a protection circuit of a battery pack as is shown in FIG. 5.

The illustrated semiconductor device (charge/discharge protection circuit) 1 as a main component of a battery pack A includes an overcharge detection circuit 11, an over-discharge detection circuit 12, a discharge over-current detection circuit 13, a short-circuit detection circuit 14, an oscillation circuit 16, a counter circuit 17, logic circuits 18, 20, a level shift circuit 19, a charge over-current detection circuit 21, delay circuits 24, 25, and a delay time reduction circuit 23.

In the following, basic operations performed by the semiconductor device (charge/discharge protection circuit) 1 are described.

When overcharge, over-discharge, discharge over-current, charge over-current, or short-circuit is detected by the overcharge detection circuit 11, the over-discharge detection circuit 12, the discharge over-current detection circuit 13, the charge over-current detection circuit 21, or the short-circuit detection circuit 14, the oscillation circuit 16 is activated and the counter circuit 17 starts counting operations.

After the counter circuit 17 counts to a predetermined detection delay time that is set for a corresponding detection, in the case of overcharge or charge over-current detection, a Cout output is switched to low level "L" via the logic circuit (e.g., latch circuit) 18 and the level shift circuit 19 so that a charge control FET Q1 is turned off; and in the case of over-discharge, discharge over-current, or short-circuit detection, a Dout output is switched to low level "L" via the logic circuit 20 so that a discharge control FET Q2 is turned off.

When a charger is connected to the battery pack A so that charge current flows into the battery pack A, the source voltage of the charge control FET Q1 becomes lower than the source voltage of the discharge control FET Q2. It is noted that the source voltage of the discharge control FET Q2 corresponds to the Vss terminal voltage of the semiconductor device 1, and although a resistance is connected to a V− terminal of the semiconductor device, since the V− terminal has high impedance, the source voltage of the charge control FET Q1 may be substantially equal to the V− terminal voltage of the semiconductor device 1.

Accordingly, when charge current is supplied, the V− terminal voltage becomes lower than the Vss terminal voltage. When the difference between the V− terminal voltage and the Vss terminal voltage reaches a predetermined voltage (charge over-current detection voltage), charge over-current is detected so that the output of terminal Cout is switched to low level "L" and the charge control FET Q1 is turned off. It is noted that the relationship between a charge over-current value I, a charge over-current detection voltage Vchgdet, the ON resistance Ron1 of the charge control FET Q1, and the ON resistance Ron2 of the discharge control FET Q2 may be expressed by the following formula:

$$I = Vchgdet/(Ron1 + Ron2)$$

The above-described operations are basic operations performed by the charge/discharge protection circuit (semiconductor device) of FIG. 5 upon detecting overcharge, over-discharge, charge over-current, discharge over-current, or short-circuit.

In the following, the function and circuit configuration of the delay time reduction circuit 23 are briefly described.

Normally, the delay time set with respect to overcharge detection by the overcharge detection circuit 11 is at least 1 second so that a test time for testing the semiconductor device 1 may be relatively long.

In turn, when testing the semiconductor device 1 or a protection circuit substrate, a TEST terminal may be set to low level "L" so that the output frequency of the oscillation circuit 16 may be increased and the detection delay time may be decreased to enable reduction of the test time. It is noted that this scheme may also be applied to overcharge, over-discharge, or discharge over-current detection but is particularly advantageous when applied to overcharge detection that requires a relatively long delay time.

The oscillation circuit 16 may be a ring oscillator that includes a constant current inverter and a condenser, for example. It is noted that the oscillation frequency of a ring oscillator is determined by a constant current value of a constant current source, a capacitor value, and a threshold value of the constant current inverter. Thus, a method for reducing the delay time may involve setting the signal of the test terminal to low level "L" to thereby (a) increase the constant current value of the constant current source; (b) substantially decrease the capacity value of a capacitor; or (c) change the threshold value of the constant current inverter of the ring oscillator, for example.

In another example, the position at which the output of the counter circuit 17 is obtained may be changed to reduce the delay time instead of changing the oscillation frequency of the oscillation circuit 16, the details of which are described in Japanese Laid-Open Patent Publication No. 2002-176730.

In the charge/discharge protection circuit shown in FIG. 5, recovery from over-discharge status to dischargeable status may be realized by establishing connection with a charger. In this case, if a Vdd terminal voltage is less than or equal to an over-discharge detection voltage when a charger is connected, a charge current is supplied via a parasitic diode of the discharge control FET Q2, and then, after the Vdd terminal voltage becomes higher than the over-discharge detection voltage, the output of terminal Dout may be set to high level "H" to turn on the discharge control FET Q2 and switch to dischargeable status. On the other hand, if the Vdd terminal voltage is higher than the over-discharge detection voltage when the charger is connected, the Dout terminal may be immediately switched to high level "H".

It is noted that a PIN for recognizing charger connection or a comparator may be used to enable such charger connection recovery operations. However, the number of terminals has to be increased at the charger side as well as the IC side when the PIN is used, and in the case where the comparator is used, the chip size has to be increased so that current consumption may be increased.

Accordingly, there is a demand for a charge/discharge protection circuit that is capable of controlling on/off operations of a discharge control FET using existing PINs and circuits, preventing the current consumption and the chip size from increasing, preventing degradation of the discharge control FET when a charger is connected, and reducing a battery charge time. There is also a demand for a battery pack embedding such a charge/discharge protection circuit and an electronic apparatus using such a battery pack.

DISCLOSURE OF THE INVENTION

According to one embodiment of the present invention, a charge/discharge protection circuit that protects a secondary battery from overcharge, over-discharge, charge over-current, and discharge over-current is provided, the charge/discharge protection circuit including:
  an overcharge detection circuit;
  an over-discharge detection circuit;
  a charge over-current detection circuit;
  a discharge over-current detection circuit;
  a charge control FET that is turned off when overcharge is detected by the overcharge detection circuit and when charge over-current is detected by the charge over-current detection circuit;
  a discharge control FET that is turned off when over-discharge is detected by the over-discharge detection circuit and when discharge over-current is detected by the discharge over-current detection circuit; and
  a charger connection recovery circuit that controls on/off operations of the discharge control FET such that when connection with a charger is established at a time over-discharge is detected and the discharge control FET is turned off, the discharge control FET is forcefully turned on after a first predetermined time elapses.

According to another embodiment of the present invention, a battery pack is provided that includes a charge/discharge protection circuit according to an embodiment of the present invention.

According to another embodiment of the present invention, an electronic apparatus is provided that includes a battery pack according to an embodiment of the present invention.

BRIEF DESCRIPTION OF THE DRAWINGS

FIG. 2A is a diagram illustrating charger connection recovery control operations when no over-discharge, over-discharge, or over-current is detected, and no charger is connected;

FIG. 4 is a timing chart illustrating charge operations that are performed when a charger is connected.

BEST MODE FOR CARRYING OUT THE INVENTION

In the following, preferred embodiments of the present invention are described with reference to the accompanying drawings.

Figure 1:
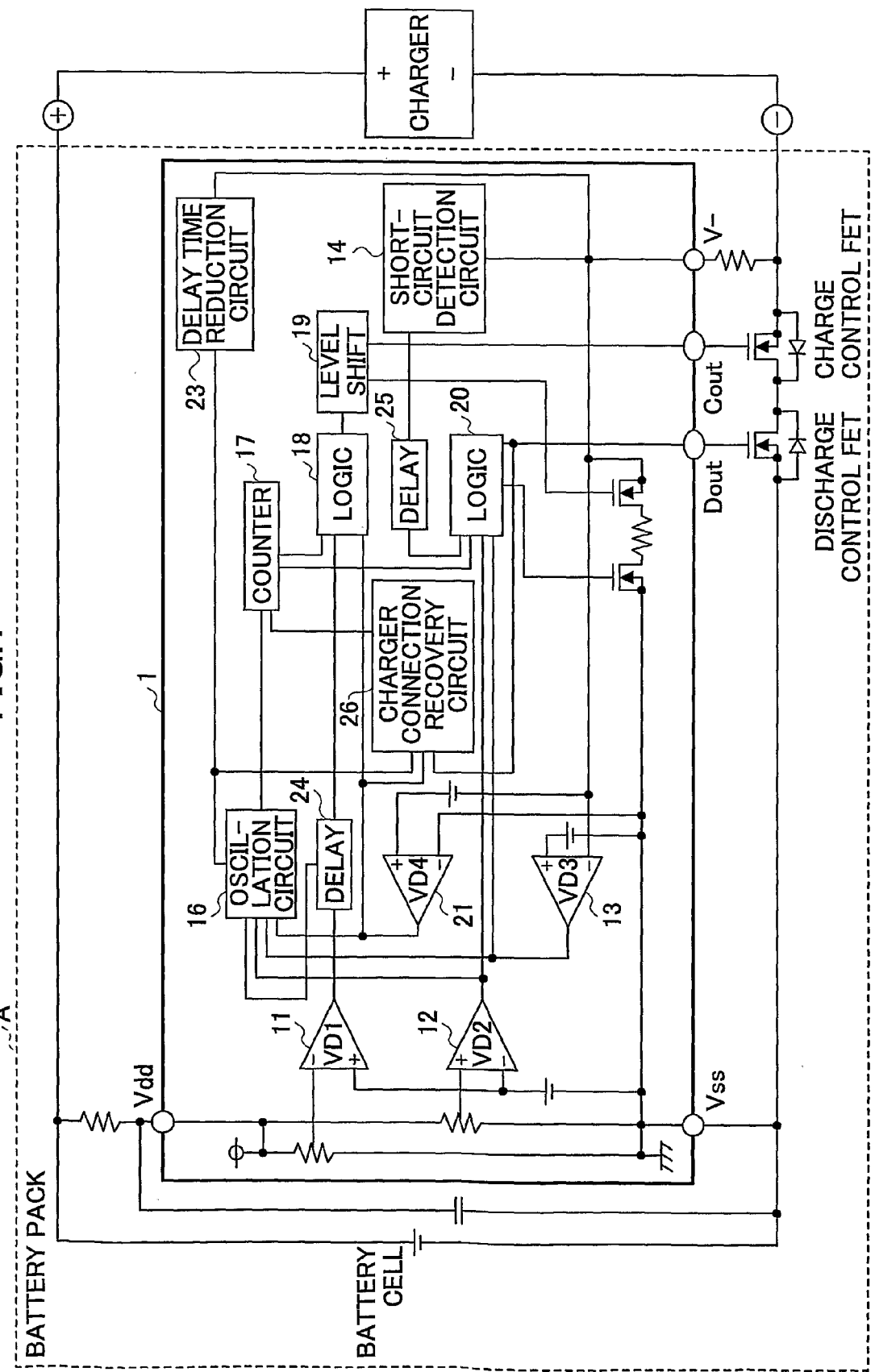
FIG. 1 is a diagram showing a charge/discharge protection circuit according to an embodiment of the present invention that is embedded in a battery pack.

FIG. 1 is a diagram showing a charge/discharge protection circuit (semiconductor device) according to an embodiment of the present invention.

Figure 5:
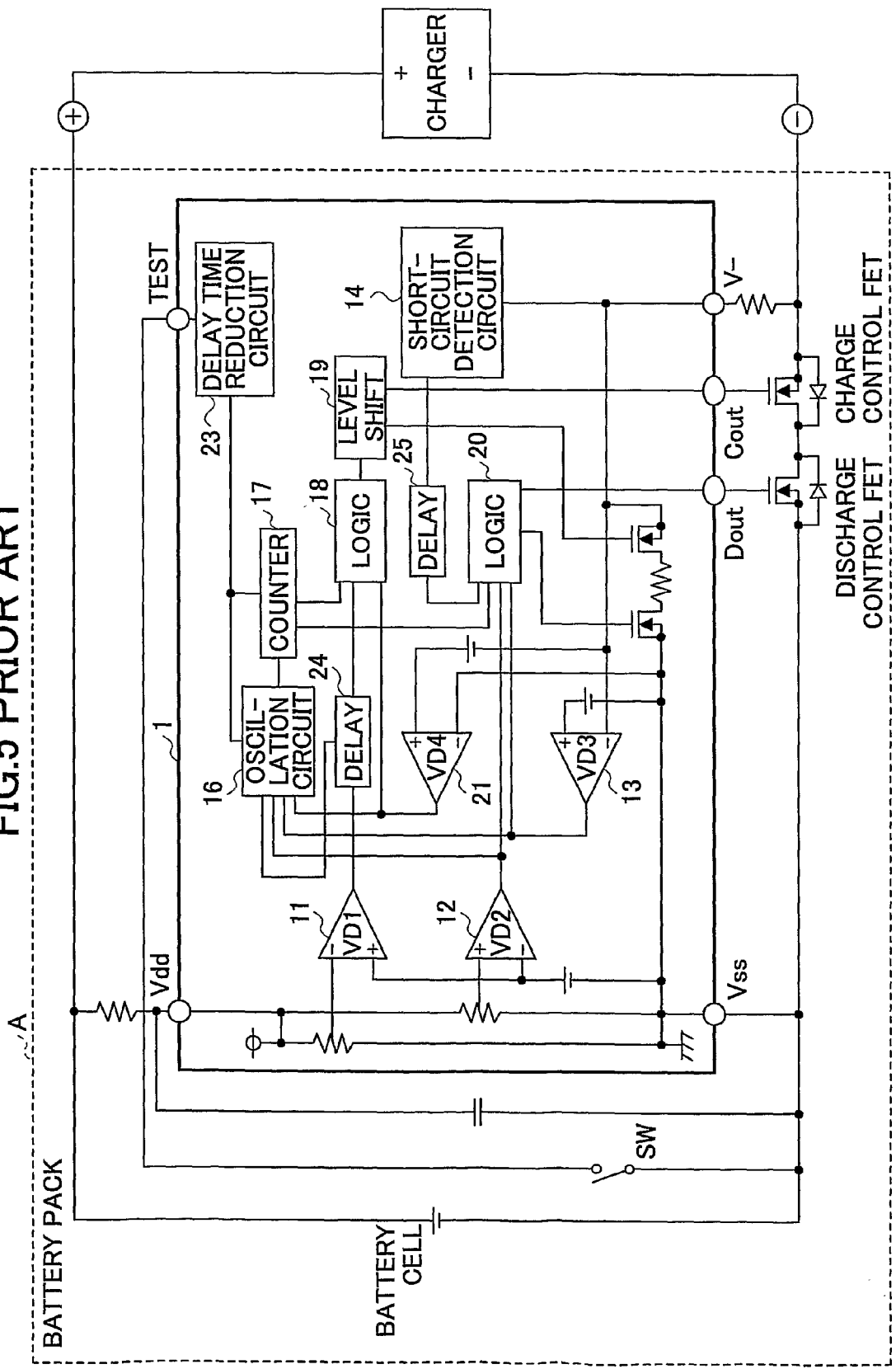
FIG. 5 is a diagram showing a charge/discharge protection circuit according to a prior art example.

The illustrated charge/discharge protection circuit of FIG. 1 differs from the circuit shown in FIG. 5 in that it does not include a TEST terminal and includes a charger connection recovery circuit 26. It is noted that components of the charge/discharge protection circuit of the present embodiment that are identical to those shown in FIG. 5 are given the same reference numbers.

The charge/discharge protection circuit 1 of the present embodiment includes an overcharge detection circuit 11, an over-discharge detection circuit 12, a discharge over-current detection circuit 13, a short-circuit detection circuit 14, an oscillation circuit 16, a counter circuit 17, logic circuits 18, 20, a level shift circuit 19, a charge over-current detection circuit 21, delay circuits 24, 25, a delay time reduction circuit 23, and the charger connection recovery circuit 26.

As is described above, the TEST terminal is not provided in the semiconductor device (charge/discharge detection circuit) 1 of FIG. 1 so that the number of terminals may be reduced compared to the semiconductor device 1 of FIG. 5. In the present embodiment, during test mode operations, instead of applying a low level "L" signal to the TEST terminal, a signal with a predetermined value (e.g., −3 V) that is normally not applied to the V− terminal is applied to the delay time reduction circuit 23 to reduce the delay time in the manner described in relation to FIG. 5 (e.g., increasing the constant current value of the constant current source, substantially decreasing the capacity of the capacitor, or changing the threshold value of the constant current inverter).

It is noted that basic charge/discharge protection operations performed within the semiconductor device 1 of FIG. 1 may be similar to the operations performed in the semiconductor device 1 shown in FIG. 5; however, according to an aspect of the present embodiment, by providing the charger connection recovery circuit 26 in the semiconductor device 1, on/off operations of the discharge control FET Q2 may be controlled in the manner described below.

In the charger connection recovery circuit 26, a charger connection signal corresponding to an internal circuit signal of the charge over-current detection circuit 21, a delay time reduction signal corresponding to an internal circuit signal of the delay time reduction circuit 23, an over-discharge detection signal corresponding to a detection signal from the over-discharge detection circuit 12, and an over-discharge confirmation signal that is inverted after the elapse of an over-discharge recovery delay time or an over-discharge detection delay time are used to control on/off operations of the discharge control FET Q2. In a case where a charger is connected at the time over-discharge is detected, the discharge control FET Q2 is forcefully turned on after the elapse of the over-discharge recovery delay time (first predetermined time) and then forcefully turned off after the elapse of the over-discharge detection delay time (second predetermined time). Further, in a case where a battery cell voltage is still less than or equal to an over-discharge detection voltage, the operations of turning on the discharge control FET Q2 after the elapse of the over-discharge recovery delay time and turning off the discharge control FET Q2 after the elapse of the over-discharge detection delay time are repeated. In one preferred embodiment, the over-discharge recovery delay time and the over-discharge detection delay time may be determined based on variations in internal circuit temperature characteristics, charger temperature characteristics, over-discharge recovery delay time temperature characteristics, and over-discharge detection delay time temperature characteristics, for example.

In the following, specific operations performed within the charger connection recovery circuit 26 are described.

The charger connection signal corresponding to an internal signal of the charge over-current detection circuit 21 is set to high level "H" when a charger is connected and is set to low level "L" when a charger is not connected.

The delay time reduction signal corresponding to an internal signal of the delay time reduction circuit 23 is set to low level "L" when the delay time is being reduced and is set to high level "H" when the delay time is not reduced.

The over-discharge detection signal corresponding to an internal signal of the over-discharge detection circuit (VD2) 12 is set to high level "H" when over-discharge is detected and is set to low level "L" when over-discharge is not detected.

The over-discharge confirmation signal that is obtained from an internal signal of the over-discharge detection circuit (VD2) 12 is set to high level "H" after the elapse of the over-discharge detection delay time (second predetermined time: "tVdet2" of FIG. 4) from the time over-discharge is detected, and is set to low level "L" when over-discharge is not detected.

In the following, exemplary charger connection recovery control operations performed by the charger connection recovery circuit 26 are described with reference to FIGS. 2A-2C.

[FIG. 2A: Overcharge Undetected, Over-Discharge Undetected, Over-Current Undetected, Charger Not Connected]

When no overcharge, over-discharge, or over-current is detected and a charger is not connected (i.e., normal operations mode), the charge control FET Q1 and the discharge control FET Q2 are both turned on. In this case, the charger connection signal is at "L" level since the charger is not connected.

The delay time reduction signal is at "H" level since operations are not in test mode (delay time reduction mode). Accordingly, "H" level and "L" level inputs are supplied to NAND gate M1 so that an "H" level output is obtained at M1.

Since over-discharge is not detected in the present case, the over-discharge detection signal is at low level "L", and the "H" level output of M1 and the over-discharge detection signal at "L" level are input to NAND gate M2 so that an "H" level output is obtained at M2.

The "H" level output of M2 is input to inverter M3 so that an "L" level output is obtained at M3.

Since the over-discharge detection confirmation signal is at low level "L" when over-discharge is not detected, the "L" level output of M3 and the over-discharge detection confirmation signal at "L" level are input to EXNOR gate M4 so that an "H" level output is obtained at M4. The "H" level output of M4 is then input to a counter, and in this case, the counter is not activated. Thus, in normal operations mode, both the charge control FET Q1 and the discharge control FET Q2 are turned on.

Figure 2B:
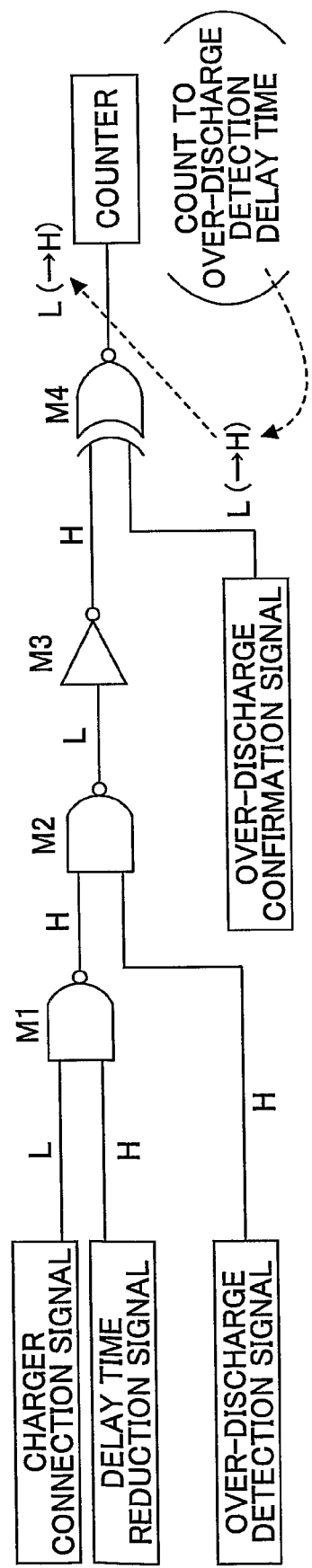
FIG. 2B is a diagram illustrating charger connection recovery control operations when over-discharge is detected and a charger is not connected.

[FIG. 2B: Over-Discharge Detected and Charger Not Connected]

When over-discharge is detected and a charger is not connected, the charger connection signal is at "L" level since a charger is not connected and the delay time reduction signal is at "H" level since operations are not in test mode (delay time reduction mode). Accordingly, "L" level and "H" level inputs are supplied to NAND gate M1 so that an "H" level output is obtained at M1.

Since over-discharge is detected in the present case, the over-discharge detection signal is at "H" level. Accordingly, the "H" level output of M1 and the over-discharge detection signal at "H" level are input to NAND gate M2 so that an "L" level output is obtained at M2.

The "L" level output of M2 is input to inverter M3 so that an "H" level output is obtained at M3. The "H" level output of M3 and the over-discharge detection confirmation signal at "L" level are input to EXNOR gate M4 so that an "L" level output is obtained at M4. The "L" level output of M4 is input to the counter so that counting operations of the counter are activated. Then, after a predetermined time (over-discharge detection delay time) elapses from the time counting operations are started, the over-discharge detection confirmation signal is switched to "H" level. In turn, the output of M4 is switched to "H" level so that counting operations of the counter are stopped and the discharge control FET Q2 is turned off. In one embodiment, the over-discharge detection confirmation signal may be inverted after the elapse of the predetermined time (over-discharge detection delay time) by inverting a flip flop that outputs the over-discharge detection confirmation signal at the time the counter counts to the predetermined time (over-discharge detection delay time).

Figure 2C:
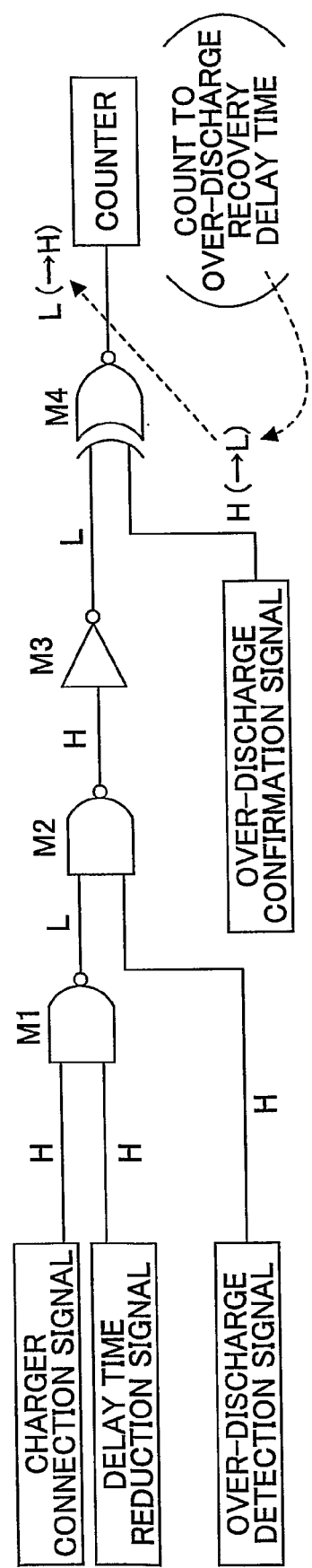
FIG. 2C is a diagram illustrating charger connection recovery control operations when over-discharge is detected and a charger is connected.

[FIG. 2C: Over-Discharge Detected and Charger Connected]

When over-discharge is detected and a charger is connected, the charger connection signal is set to "H" level and the delay time reduction signal is set to "H" level. The charger connection signal at "H" level and the delay time reduction signal at "H" level are input to NAND gate M1 so that an "L" level output is obtained at M1.

Since over-discharge is detected in the present case, the over-discharge detection signal is set to "H" level. Accordingly the "L" level output of M1 and the over-discharge detection signal at "H" level are input to NAND gate M2 so that an "H" level output is obtained at M2. The "H" level output of M2 is input to inverter M3 so that an "L" level output is obtained at M3.

Since over-discharge is detected in the present case, the over-discharge detection confirmation signal is set to "H" level. Accordingly, the "L" level output of M3 and the over-discharge detection confirmation signal at "H" level are input to EXNOR gate M4 so that an "L" level output is obtained at M4. The "L" level output of M4 is input to the counter so that counting operations of the counter are activated. Then, after a first predetermined time (over-discharge recovery delay time) elapses from the time counting operations are started, the discharge control FET Q2 may be forcefully turned on. In one embodiment, the over-discharge detection confirmation signal may be inverted after the elapse of the first predetermined time (over-discharge recovery delay time) by inverting a flip flop that outputs the over-discharge detection confirmation signal at the time the counter counts to the first predetermined time (over-discharge recovery time).

It is noted that in the case where the battery cell voltage is less than or equal to the over-discharge detection voltage, the discharge control FET Q2 is turned off after the elapse of the over-discharge detection delay time. However, when the charger is connected as in the example described above, the discharge control FET Q2 is forcefully turned on after the elapse of the over-discharge recovery delay time.

Thus, when a charger is connected at the time the battery cell voltage is less than or equal to the over-discharge detection voltage, pulse charge operations are performed by repeating the operations of turning off the discharge control FET Q2 after the elapse of the over-discharge detection delay time and turning on the discharge control FET Q2 after the elapse of the over-discharge recovery delay time. It is noted that the pulse width of the charge pulse may be adjusted by changing the over-discharge detection delay time and the over-discharge recovery delay time according to variations in temperature characteristics of the internal circuits, the charger and the IC, for example.

FIG. 4 is a timing chart illustrating charge operations performed when a charger is connected.

As is shown in FIG. 4, when the level of Vdd is higher than the over-discharge detection voltage (Vdet2) but lower than an overcharge detection voltage, the output of Dout is set to "H" level. When the output of Dout is at "H" level, the discharge control FET Q2 that is connected to Dout is turned on so that charge/discharge operations are enabled.

When the level of Vdd falls to the over-discharge detection voltage (Vdet2) or lower, the internal counter 17 counts to the over-discharge detection delay time (tVdet2) after which the output of Dout is switched to "L" level. When the output of Dout is switched to "L" level, the discharge control FET Q2 that is connected to Dout is turned off so that discharge operations are disabled. When the charger is not connected at the time over-discharge is detected, the level of the V− terminal is raised to equal the level of Vdd by the internal circuits.

When the charger is connected under such conditions, the V− terminal temporarily falls to a charge over-current detection voltage (Vdet4) or lower. When the charge over-current (Vdet4) is detected, recovery from the over-discharge detection status to dischargeable status may be enabled by the charge over-current detection signal, the delay time reduction signal, the over-discharge detection signal, and the over-discharge detection confirmation signal, for example.

In this case, the discharge control FET Q2 is turned on after the elapse of the over-discharge recovery delay time (tVrel2). When the level of Vdd does not rise above the over-discharge detection voltage (Vdet2) even after the elapse of the over-discharge detection delay time (tVdet2), the discharge control FET Q2 is turned off (Dout is switched to "L" level) after the elapse of the over-discharge detection delay time (tVdet2).

When the charger is connected at the time Dout is switched to "L" level, the above-described on/off operations of the discharge control FET Q2 may be repeated. Thus, the discharge control FET Q2 is turned back on after the elapse of the over-discharge recovery delay time (tVrel2).

By repeating the above described on/off operations, pulse charge operations controlled by the over-discharge recovery delay time (tVrel2) and the over-discharge detection delay time (tvdet2) are performed until the level of Vdd rises above the over-discharge detection voltage.

It is noted that according to an exemplary charge operation scheme, initial charge operations may be started in response to the connection of a charger. Then, the battery cell voltage may be checked by temporarily halting the charge operations (see "halt charge" of FIG. 4), and the charge operations may be resumed after the battery cell voltage is checked.

However, when the level of Vdd is less than or equal to the over-discharge detection voltage (Vdet2) so that the discharge control FET Q2 is turned off and charge operations are not performed, it may not be possible to monitor the battery cell voltage.

Thus, according to an embodiment of the present invention, the discharge control FET Q2 that is turned off may be forcefully turned on after the elapse of a first predetermined time (over-discharge recovery delay time "tVrel2") so that the battery cell voltage may be monitored. In one preferred embodiment, the first predetermined time may be determined based on variations in internal circuit temperature characteristics, charger temperature characteristics, over-discharge recovery delay time temperature characteristics, and over-discharge detection delay time temperature characteristic, for example.

It is noted that embodiments of the present invention may be widely used in a variety of applications. For example, a charge/discharge protection circuit according to an embodiment of the present invention may be embedded in a battery pack, and the battery pack may be installed in various types of electronic apparatuses such as a mobile phone, a portable game apparatus, a digital camera, or a portable audio apparatus.

Figure 3A:
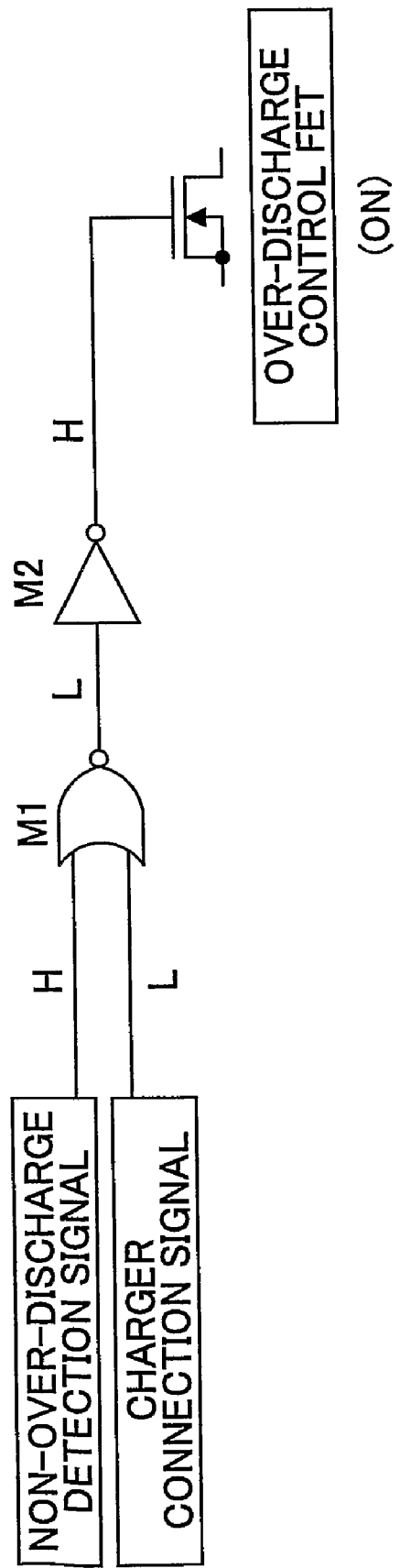
FIG. 3A is a diagram illustrating operations for controlling a discharge control FET in a case where a charger connection detection terminal is provided, the operations being performed when over-discharge is not detected and a charger is not connected.
Figure 3B:
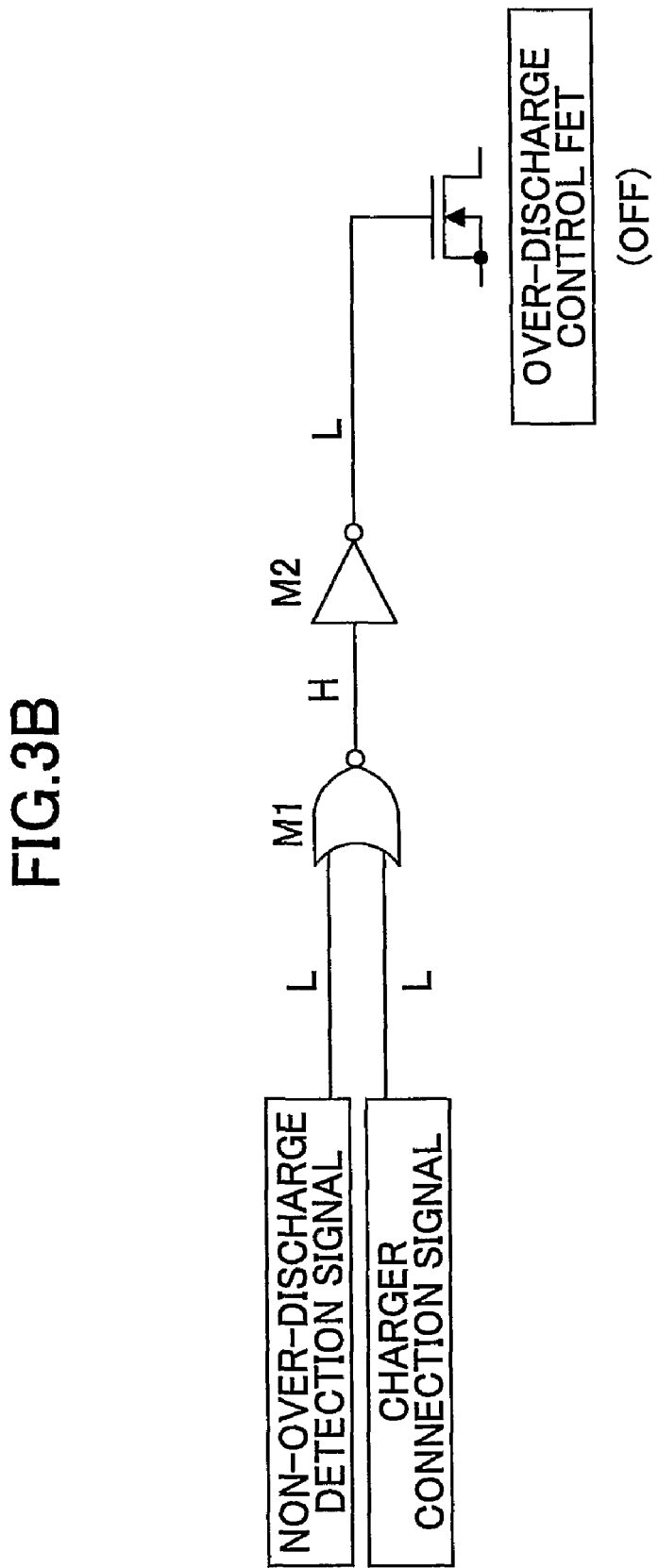
FIG. 3B is a diagram illustrating another set of operations for controlling the discharge control FET using the charger connection detection terminal, the operations being performed when over-discharge is detected and a charger is not connected.
Figure 3C:
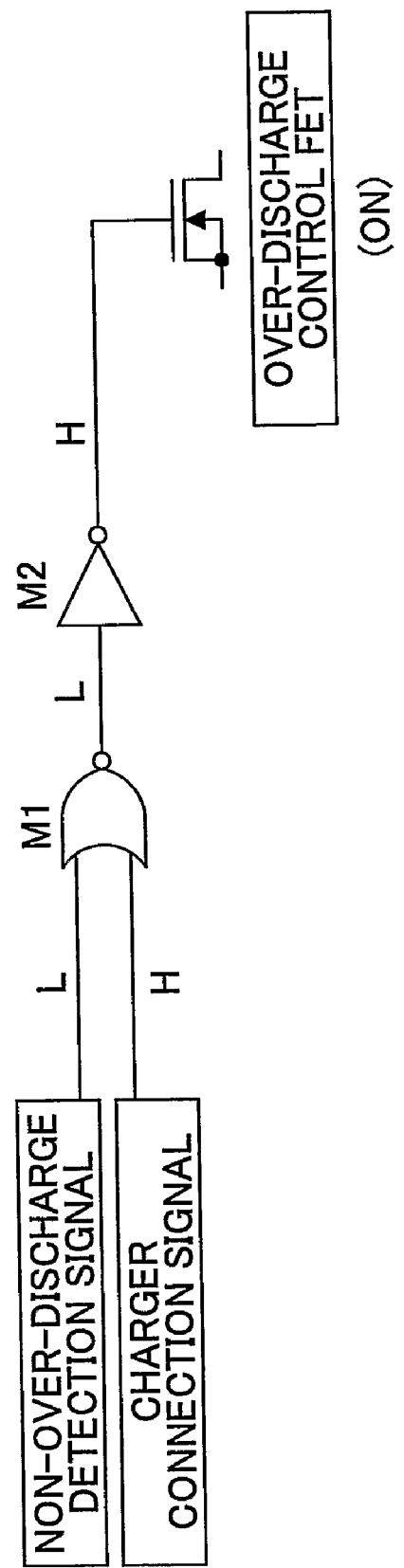
FIG. 3C is a diagram illustrating another set of operations for controlling the discharge control FET using the charger connection detection terminal, the operations being performed when over-discharge is detected and a charger is connected.

In the following, another exemplary method for controlling on/off operations of the discharge control FET Q2 is described. In this example, a charger connection detection terminal for detecting connection of a charger is provided to enable charger connection recovery control operations. FIGS. 3A-3C are diagrams illustrating operations for controlling the discharge control FET Q2 under various conditions in the present example where such a charger connection detection terminal for detecting connection of a charger is used.

[FIG. 3A: Over-Discharge Undetected, Charger Not Connected]

The charger connection signal may normally be at "L" level, and may be switched to "H" level when a signal from a battery pack positive (+) side of a charger is input and the charger is connected. In this case, when a source voltage is below an overcharge detection level and above an over-discharge detection level, a non-over-discharge detection signal that is set to "H" level when over-discharge is not detected and is set to "L" level when over-discharge is detected may be at "H" level.

When a charger is not connected, the charger connection signal is set to "L" level so that an "L" level output is obtained at NAND gate M1. The "L" level output of M1 is input to inverter M2 so that an "L" level output is obtained at M2. When the output of M2 is at "L" level, the discharge control FET Q2 corresponding to an N-channel FET may be turned on.

[FIG. 3B: Over-Discharge Detected and Charger Unconnected]

When over-discharge is detected, the non-over-discharge detection signal at "L" level is output, and when a charger is not connected, the charger connection signal at "L" level is output. The above "L" level outputs are input to NAND gate M1 so that an "H" level output may be obtained at M1. The "H" level output of M1 is input to inverter M2 so that an "L" level output may be obtained at M2. When the output of M2 is at "L" level the discharge control FET Q2 is turned off.

[FIG. 3C: Over-Discharge Detected and Charger Connected]

When a charger is connected at the time over-discharge is detected, the non-over-discharge detection signal at "L" level is output and the charger connection signal at "H" level is output. The above "L" level output and "H" level output are input to NAND gate M1 so that an "L" level output is obtained at M1. The "L" level output of M1 is input to inverter M2 so that an "H" level output is obtained at M2. When the output of M2 is at "H" level, the discharge control FET is turned on.

In the following, exemplary advantages that may be realized by embodiments of the present invention are described.

According to one aspect of the present invention, a charge/discharge protection circuit with low current consumption and a relatively small chip size that is capable of preventing degradation of a discharge control FET when a charger is connected and reducing a battery charge time may be provided.

Specifically, in a charge/discharge protection circuit according to an embodiment of the present invention, even when a battery cell voltage is less than or equal to an over-discharge detection voltage so that the discharge control FET is turned off, the discharge control FET may be forcefully turned on when a charger is connected. It is noted that in a conventional charge/discharge protection circuit, when a charger is connected to perform charge operations at the time a discharge control FET is turned off, first, charge operations are performed using a parasitic diode of the discharge control FET. However, when such a parasitic diode is used in the charge operations, the discharge control FET may be prone to degradation. In view of such a problem in the conventional charge/discharge protection circuit, a charge/discharge protection circuit according to an embodiment of the present invention controls the discharge control FET to be forcefully turned on when a charger is connected at the time the discharge control FET is turned off to thereby prevent degradation of the discharge control FET and enable efficient charge operations in a short period of time, for example. Also, a charge/discharge protection circuit according to one preferred embodiment of the present invention does not have to include an additional terminal for detecting connection of a charger so that an increase in current consumption and chip size may be prevented, for example.

According to another aspect of the present invention, the charge/discharge protection circuit according to an embodiment of the present invention may be embedded in a battery pack that is widely used in a variety of electronic apparatuses such as a mobile phone, a portable game apparatus, a digital camera, and a portable audio apparatus.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No. 2006-153848 filed on Jun. 1, 2006, the entire contents of which are hereby incorporated by reference.

The invention claimed is:

1. A charge/discharge protection circuit that protects a secondary battery from overcharge, over-discharge, charge over-current, and discharge over-current, said charge/discharge protection circuit comprising:
   an overcharge detection circuit;
   an over-discharge detection circuit;
   a charge over-current detection circuit;
   a discharge over-current detection circuit;
   a charge control FET that is turned off when overcharge is detected by the overcharge detection circuit and when charge over-current is detected by the charge over-current detection circuit;
   a discharge control FET that is turned off when over-discharge is detected by the over-discharge detection circuit and when discharge over-current is detected by the discharge over-current detection circuit; and
   a charger connection recovery circuit that controls on/off operations of the discharge control FET such that when connection with a charger is established at a time over-discharge is detected and the discharge control FET is turned off, the discharge control FET is forcefully turned on after an over-discharge recovery delay time elapses,
   wherein the discharge control FET is turned off after an over-discharge detection delay time elapses from the time the discharge control FET is forcefully turned on.

2. The charge/discharge protection circuit as claimed in claim 1, wherein
   when a battery cell voltage is less than or equal to an over-discharge detection voltage, operations of turning on the discharge control FET after the elapse of the over-discharge recovery delay time and turning off the discharge control FET after the elapse of the over-discharge detection delay time are repeated.

3. The charge/discharge protection circuit as claimed in claim 1, wherein
   the over-discharge recovery delay time and the over-discharge detection delay time are determined according to variations in internal circuit temperature characteristics, charger temperature characteristics, over-discharge recovery delay time temperature characteristics, and over-discharge detection delay time temperature characteristics.

4. A battery pack comprising the charge/discharge protection circuit as claimed in any one of claims 1, 2 or 3.

5. An electronic apparatus comprising a battery pack, said battery pack including a charge/discharge protection circuit that protects a secondary battery from overcharge, over-discharge, charge over-current, and discharge over-current, said charge/discharge protection circuit comprising:
   an overcharge detection circuit;
   an over-discharge detection circuit;
   a charge over-current detection circuit;
   a discharge over-current detection circuit;
   a charge control FET that is turned off when overcharge is detected by the overcharge detection circuit and when charge over-current is detected by the charge over-current detection circuit;
   a discharge control FET that is turned off when over-discharge is detected by the over-discharge detection circuit and when discharge over-current is detected by the discharge over-current detection circuit; and
   a charger connection recovery circuit that controls on/off operations of the discharge control FET such that when connection with a charger is established at a time over-discharge is detected and the discharge control FET is turned off, the discharge control FET is forcefully turned on after an over-discharge recovery delay time elapses,
   wherein the discharge control FET is turned off after an over-discharge detection delay time elapses from the time the discharge control FET is forcefully turned on.

6. A mobile phone comprising a battery pack, said battery pack comprising:
   a charge/discharge protection circuit that protects a secondary battery from overcharge, over-discharge, charge over-current, and discharge over-current, said charge/discharge protection, circuit comprising:
an overcharge detection circuit;
an over-discharge detection circuit;
a charge over-current detection circuit;
a discharge over-current detection circuit;
a charge control FET that is turned off when overcharge is detected by the overcharge detection circuit and when charge over-current is detected by the charge over-current detection circuit;
a discharge control FET that is turned off when over-discharge is detected by the over-discharge detection circuit and when discharge over-current is detected by the discharge over-current detection circuit; and
a charger connection recovery circuit that controls on/off operations of the discharge control FET such that when connection with a charger is established at a time over-discharge is detected and the discharge control FET is turned off, the discharge control FET is forcefully turned on after an over-discharge recovery delay time elapses, wherein the discharge control FET is turned off after an over-discharge detection delay time elapses from the time the discharge control FET is forcefully turned on.

* * * * *